Figure 1:
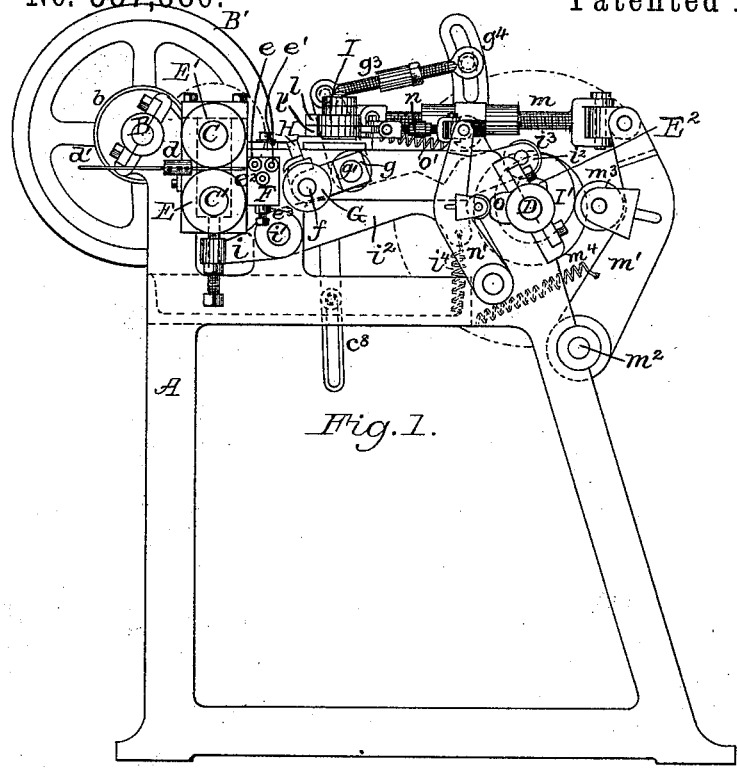

(No Model.) 5 Sheets—Sheet 1.

W. L. GODDARD.
MACHINE FOR MAKING COILED WIRE SPRINGS.

No. 357,380. Patented Feb. 8, 1887.

Attest:
Philip F. Larner.
C. W. H. Brown.

Inventor:
William L. Goddard.
By [signature]
Attorney.

(No Model.) 5 Sheets—Sheet 2.

W. L. GODDARD.
MACHINE FOR MAKING COILED WIRE SPRINGS.

No. 357,380. Patented Feb. 8, 1887.

Attests:
Philip F. Larner
C. W. H. Brown

Inventor:
William L. Goddard.
By [signature], atty

N. PETERS, Photo-Lithographer, Washington, D. C.

(No Model.) 5 Sheets—Sheet 3.

W. L. GODDARD.
MACHINE FOR MAKING COILED WIRE SPRINGS.

No. 357,380. Patented Feb. 8, 1887.

Attest:
Philip F. Larner.
C. W. H. _____

Inventor:
William L. Goddard.
By _____
Attorney.

(No Model.) 5 Sheets—Sheet 4.
W. L. GODDARD.
MACHINE FOR MAKING COILED WIRE SPRINGS.
No. 357,380. Patented Feb. 8, 1887.
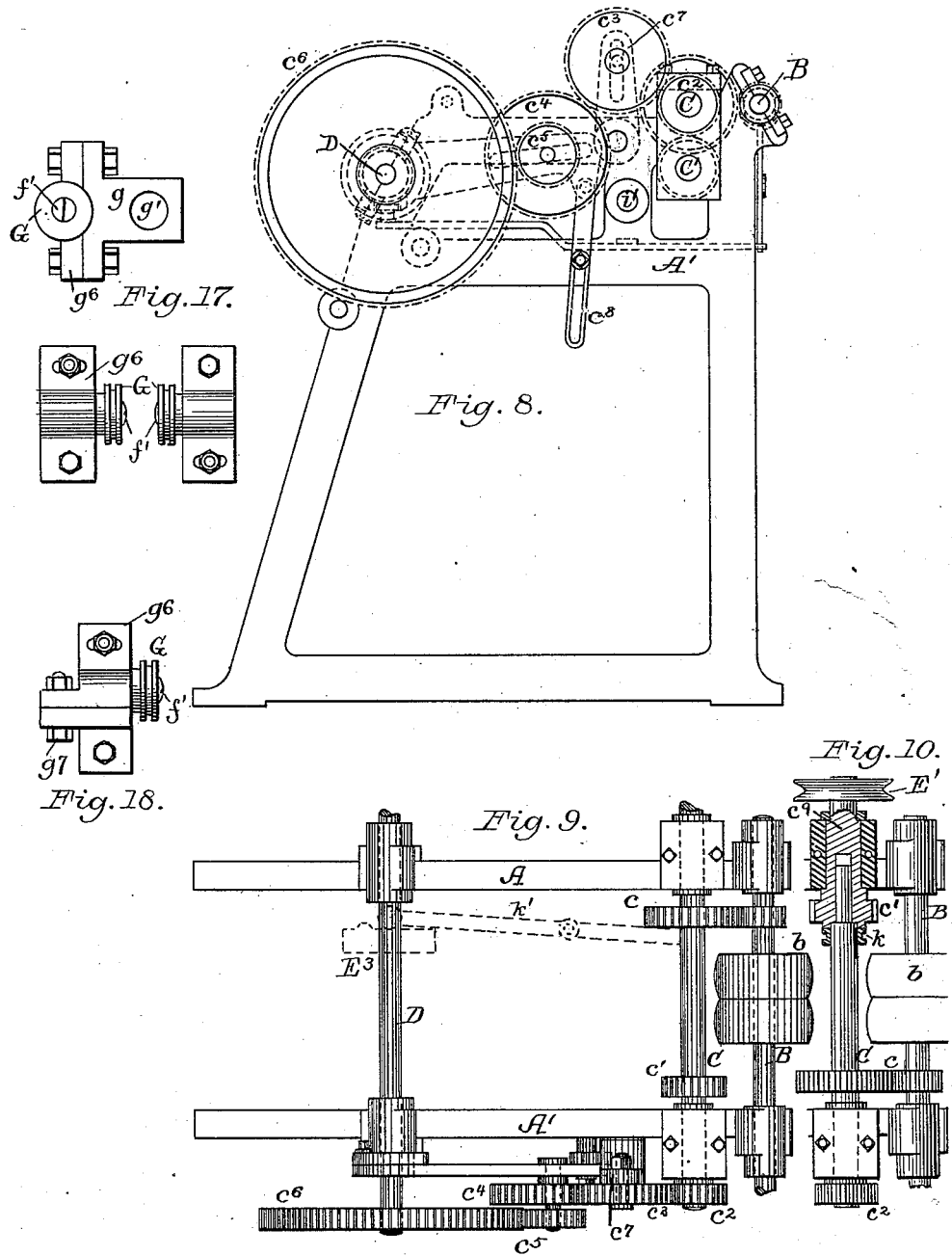

(No Model.) 5 Sheets—Sheet 5.
W. L. GODDARD.
MACHINE FOR MAKING COILED WIRE SPRINGS.
No. 357,380. Patented Feb. 8, 1887.
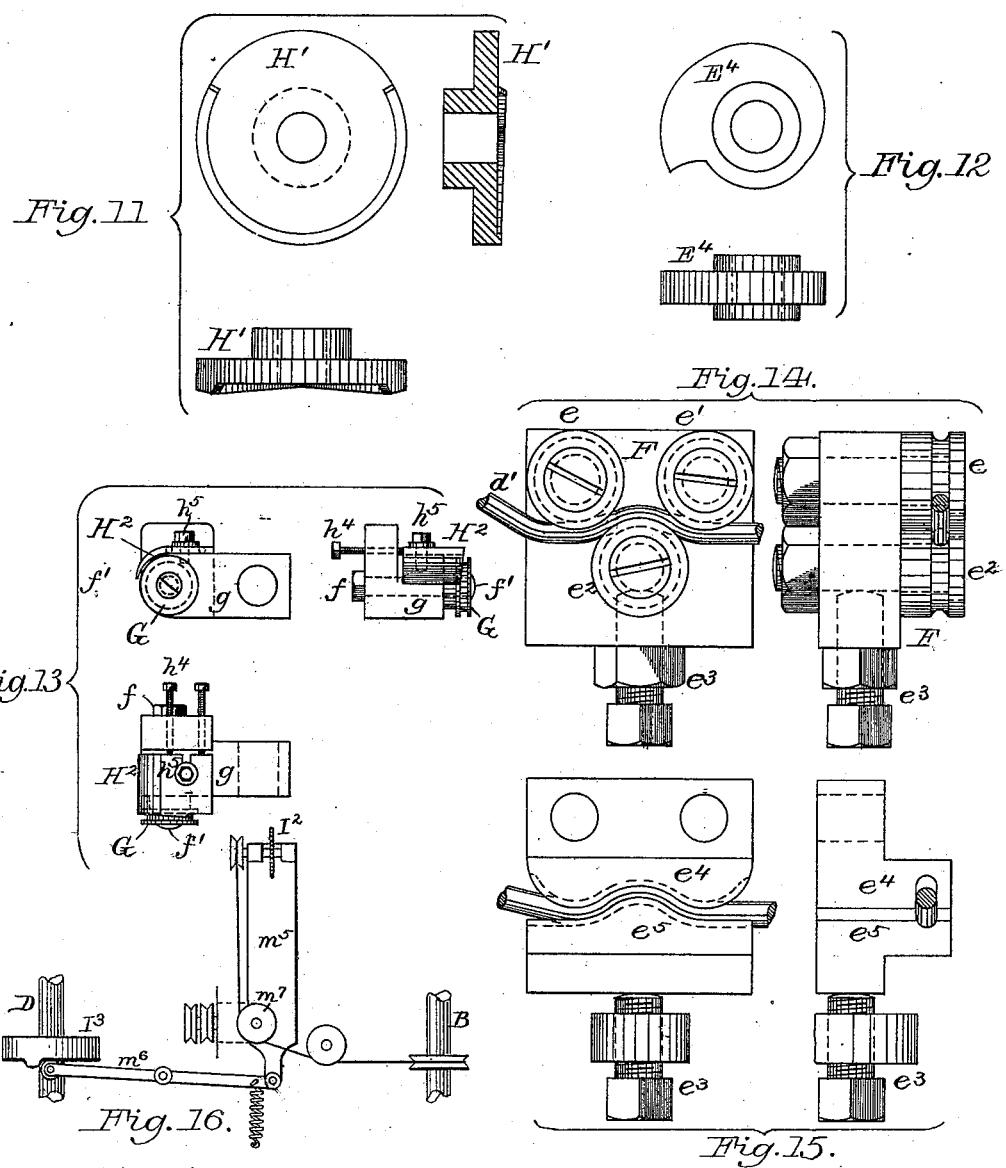

UNITED STATES PATENT OFFICE.

WILLIAM L. GODDARD, OF YONKERS, ASSIGNOR OF TWO-THIRDS TO JAMES C. GODDARD AND HENRY C. WILLIS, BOTH OF BROOKLYN, NEW YORK.

MACHINE FOR MAKING COILED-WIRE SPRINGS.

SPECIFICATION forming part of Letters Patent No. 357,390, dated February 8, 1887.

Application filed August 9, 1886. Serial No. 210,440. (No model.)

*To all whom it may concern:*

Be it known that I, WILLIAM L. GODDARD, of Yonkers, in the county of Westchester and State of New York, have invented certain new and useful Improvements in Machines for Making Coiled-Wire Springs; and I do hereby declare that the following specification, taken in connection with the drawings furnished, and forming a part of the same, is a clear, true, and complete description of the several features of my invention.

Spiral springs of different kinds may be produced by my machine; but my said improvements were devised with special reference to making upholstery-springs of the conical and biconical varieties. Machines of two general classes have heretofore been used for this purpose—one in which the form of the spring depends upon the shape of certain conical formers, and the other in which the circular bending is performed by curved-line deflectors, and the pitch determined by a co-operating pitch-line deflector acting laterally against the wire, immediately following the action of the curved-line deflector, and it is to this latter class of machines that my improvements pertain. I have included within this class such as have had angularly-adjustable deflectors, capable of serving both as curved-line and as pitch-line deflectors. In some cases machines of this class have been organized to produce a continuous series of connected springs, and others cause each spring to be separated from the incoming wire as soon as the spring has been formed. My machine can be operated either way, although a machine capable of only making a continuous series of connected springs could not involve all of my said improvements.

The objects of my invention, generally stated, are to provide a comparatively simple and highly effective machine, which can be rapidly operated, and produce highly resilient springs of uniform character. In machines of this particular class the wire cutters and the feed-rolls have been heretofore so organized that the latter would rest while the cutters operate. I have now devised a combination of feed-rolls, lever, cam, and spring for operating the feed-rolls under a yielding pressure and for separating them by the positive action of the cam; but certain other portions of my invention are not dependent upon any specific form of feed-roll-controlling mechanism. The spring affords a yielding pressure by the rolls upon the wire, thus securing a reliable feeding contact, regardless of slight variations in the diameter and sectional contour of the wire, and the spring insures prompt action in the return of the rolls from a non-operative to an operative position, and therefore with promptly-operating cutters the intervals of rest between the coiling operations are reduced to a minimum. I have also provided for taking such merchant wire as is sold in coils and presenting it to the action of the curved-line deflector in a practically straightened condition and free from that set bend which is a necessary incident to wire coiled on reels and put up in coils for the market.

Wire-straightening has heretofore been provided for in machines of this class, and also by means of a wave-line straightener similar to that employed by me; but in said prior machines said straightener has been located in front of the feed-rolls, whereas in my machine it is located at the rear of the feed-rolls and between them and the curved-line deflector. In the said prior machines the straightener does not co-operate with the curved-line deflector; but in my machine they are intimately co-operative, because it is the straightener that presents the wire directly to the deflector, and the bending performed by the latter immediately follows the bending by the straightener. The deflector can be made to approach much nearer to the straightener than it can to the feed-rolls when the latter deliver the wire directly to the said deflector, and hence in any one machine springs of very small diameters can be produced, as well as those of the largest ever desired. Moreover, with the straightener thus co-operating with the deflector the feed-rolls can be made of greater diameter than when they deliver wire directly to the deflector, thus enabling heavy feeding-pressure with less liability of deforming the wire than when small feeding-rolls are used. In my machine the wire is thrust into and through the straightener; but in prior machines the wire is drawn through, and hence in feeding in the initial end of a fresh coil of wire the straightener must be opened wide and thereafter readjusted, whereas in my machine said straightener need not be touched, because the feed-rolls can force the initial end of wire through the straightener in its already adjusted condition.

By stopping the wire during the cutting operation, coupled with presenting the wire from a wave-line straightener directly to the main or curved-line deflector, I am enabled practically to use much harder wire than has usually been heretofore used, and with a corresponding improvement in the character of the springs.

I have also devised certain minor features in the construction, combination, and arrangement of the several parts of my machine, each of which contribute more or less to the efficiency and practical value of such machine, and after describing the mechanism illustrated the several features deemed novel will be specified in the several clauses of claim hereunto annexed.

Figure 2:
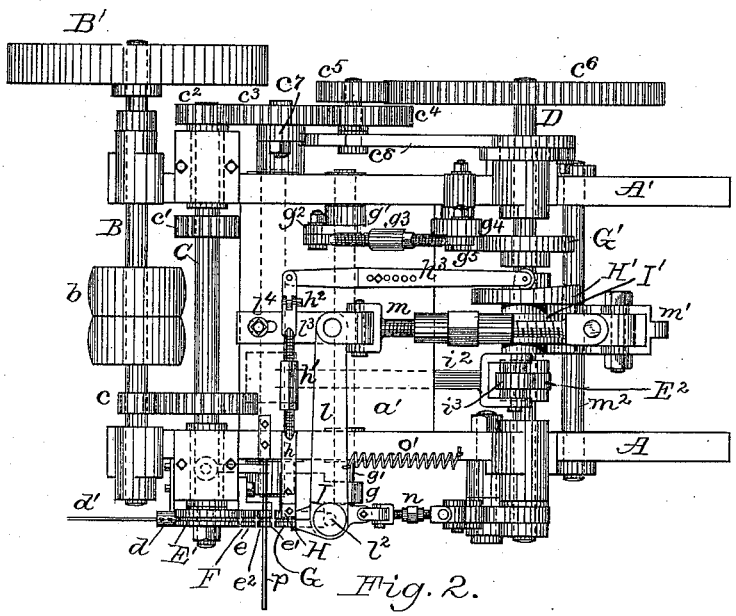
Figure 3:
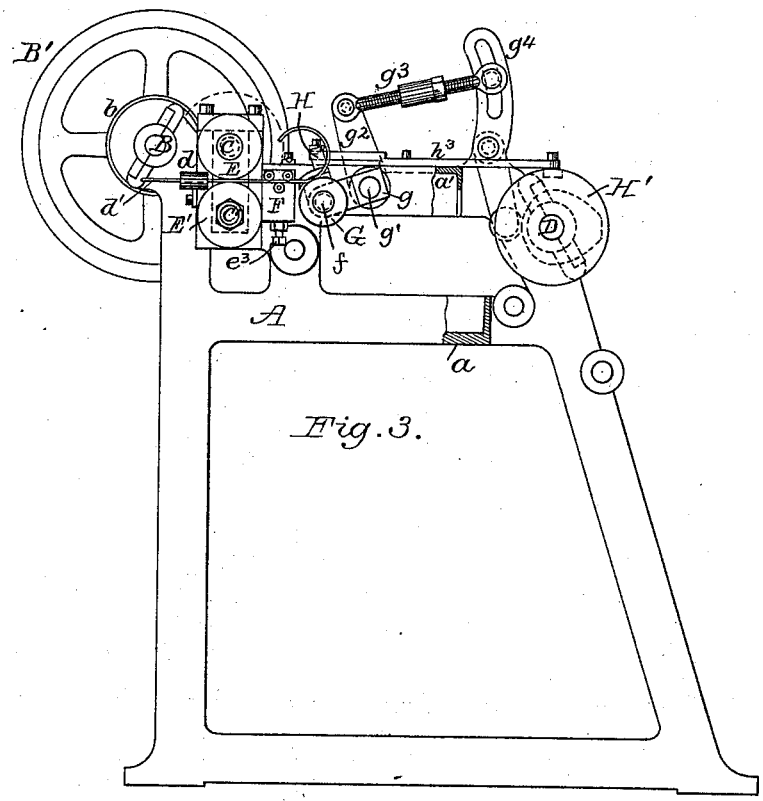
Figure 4:
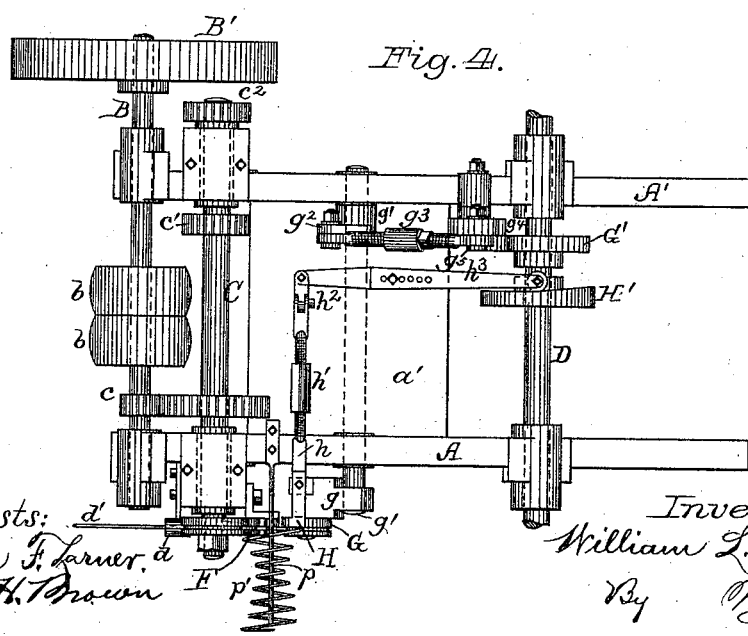
Figure 5:
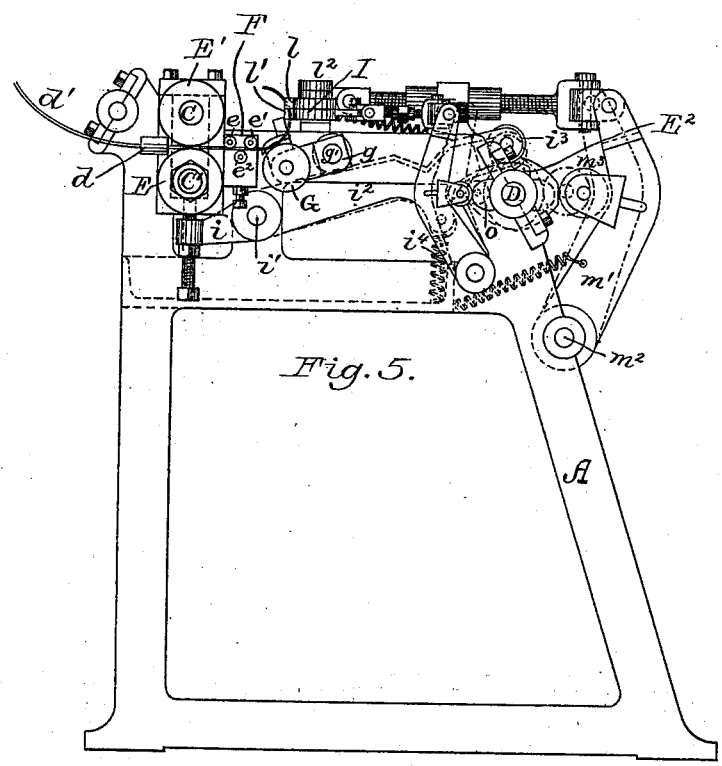
Figure 7:
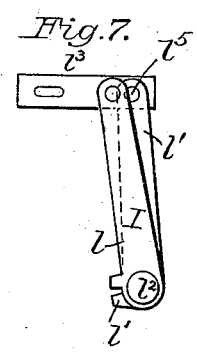
Figure 6:
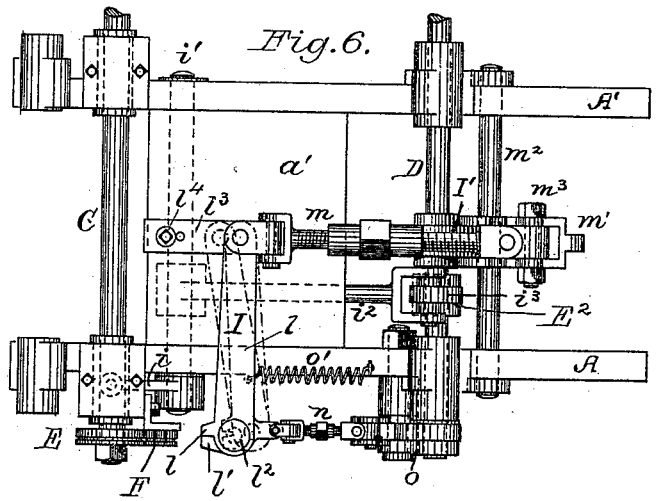

Referring to the five sheets of drawings, Figure 1 is a side elevation of a machine embodying all of my improvements. Fig. 2 is a top view of the same. Fig. 3 is a side elevation and partial section of the machine, specially intended to illustrate the straightening, feeding, bending or coiling, and pitch-line mechanism. Fig. 4 is a top view of portions of the machine shown in Fig. 3. Fig. 5 is a side view for specially illustrating the wire-cutting mechanism and one form of stop-motion by which the feeding of the wire is stopped during the cutting operation. Fig. 6 is a top view of the portions of the machine shown in Fig. 5. Fig. 7 is a top view of the cutting-shears detached. Figs. 8 and 9 are respectively a side elevation and plan illustrating the gearing. Fig. 10 illustrates another and well-known form of stop-motion for stopping the feed of the wire during the cutting operation. Fig. 11, in three views, illustrates the cam which operates one form of pitch-line deflector for making biconical springs, as in Fig. 1. Fig. 12, in two views, illustrates a cam as used by me for making single-cone springs. Fig. 13, in several views, illustrates another form of pitch-line deflector in connection with the curved-line deflector. Fig. 14, in two views, illustrates my wire-straightener in its most approved form. Fig. 15, in two views, illustrates another form of straightener. Fig. 16 illustrates a rotary cutter adapted to co-operate with portions of my invention in lieu of the cutter before referred to. Fig. 17, in several views, illustrates a curved-line deflector, adjustably mounted, so as to operate as in Fig. 1, and also so as to operate as a pitch-line deflector. Fig. 18 in side view illustrates a complex arm for the curved-line deflector, and on which it may be mounted and be capable of wide variations in pitch adjustment.

Referring to Fig. 1 and the various views based thereon, it will be seen that the frame of the machine consists, mainly, of two side plates, A and A', arranged to afford suitable bearings for the several parts mounted thereon, and said plates are bound together by suitable bolts. There are also intervening lateral plates, $a$ and $a'$, the latter being the top of the frame.

The main shaft B is provided with tight and loose pulleys at $b$, and a balance-wheel, B', is at one end of said shaft.

The feed-roll shafts C and C' and the cam-shaft D afford all the rotative movements required, and power is delivered from the main shaft to the upper feed-roll shaft, C, by gearing at $c$, and thence to the lower feed-roll by gearing at $c'$. The cam-shaft D is driven from the upper feed-roll shaft by the train of gear $c^2$, $c^3$, $c^4$, and $c^5$ to the large gear $c^6$ on the cam-shaft. Slotted standards or brackets $c^7$ and $c^8$ serve as supports for gears and their studs, and the gear $c^2$ may be changed for others, smaller or larger, according to whether the springs are to contain more or less wire than the springs to which said gear is suited.

The feed-rolls E E' have grooved peripheries, the depth of the groove being somewhat less than one-half the diameter of the wire to be used for the springs. In front of and opposite the coincident faces of the feed-rolls there is a conducting-guide, $d$, through which the wire $d'$ passes from a reel (not shown) to the feed-rolls. At the rear of the feed-rolls I have introduced a wire-straightener, by which I take out the set bend in the wire, which is derived in coiling it for the market, and deliver the wire in a well-straightened condition to the deflecting mechanism. I have, as hereinbefore indicated, sought to use much harder and more highly-tempered wire than has heretofore been generally used, and I find that by removing said set bend and coiling a spring directly from the straightened wire the product is reliably uniform. Moreover, the cold working of the metal incident to straightening and then at once bending in coiling, so hardens the wire as to result in a more lively spring than can be produced by working the same wire without thus preliminarily straightening it.

The wire-straightener F causes the wire to pass through it in a wave-line, and it must be so constructed and arranged with reference to the feed-rolls and the reel from which the wire is taken that said straightener will straighten the wire by slightly bending it in a short bight oppositely to the bend it had in the reel. As shown in Fig. 1, said straightener is in the form preferred by me, and it is composed of three slightly-grooved rolls $e$, $e'$, and $e^2$. (Shown fully in Fig. 14.) Two of these rolls have their axes in one horizontal plane; but the roll $e^2$ has its axis in another plane, and it is located midway between the rolls $e$ and $e'$. If the wire be delivered to the feed-rolls from below the reel, the straightening-roll $e^2$ is placed below the others, as shown in Fig. 1; but if the wire be delivered from above the reel the said roll $e^2$ should be located above the others, and in either case said rolls should be adjustable, as by means of the adjusting-screw $e^3$, thus providing for applying the exactly-requisite opposite bend for straightening the wire.

While the rolls as shown are preferred, because of their operation with a minimum of friction in contact with the wire, approximately desirable results will accrue if said rolls be rendered non-rotative—as, for instance, by tightening their axial screws—because then they would afford the same wave-line path for straightening the wire, and it is obvious that a wave-line straightener, as shown in Fig. 15, would serve a good purpose and involve no departure from those portions of my invention which include a wave-line straightener. In said last-named figure the wave-line blocks $e^4$ and $e^5$ present surfaces for contact with the wire corresponding to the contact-surfaces of the straightening-rolls, and said blocks can be adjusted with reference to each other by means of an adjusting-screw, $e^3$.

From the wave-line straightener the wire is longitudinally forced against the curved-line deflector G, by which the coiling of the wire is effected. As here shown, said deflecting-block G is in the form of a grooved wheel axially mounted on a stud, $f$, and provided with a center screw, $f'$, so that said wheel may revolve with any desired degree of freedom; and even if it be confined against rotation it will well perform its duty, and hence if said deflector were a block segmental in form and confined against axial movement it would still perform its work, although more friction and power would be involved than if the rotative-wheel form were used.

However the curved-line deflector may be shaped, it must occupy a fixed position with relation to the straightener (or other contrivance from which the wire is delivered to the block) in the making of straight-coiled springs; but, on the other hand, for making conical and biconical springs said block must be varied regularly in its position, so as to progressively develop coils of different diameters. I have therefore, as in prior machines of this general class, mounted said curved-line deflector upon an arm, $g$, as shown clearly in Figs. 3 and 4, which is keyed upon a rock-shaft, $g'$, on which there is another arm, $g^2$, which I have coupled by an adjustable link, $g^3$, to the slotted arm of a rocking lever, $g^4$, having at its lower end a wheel, $g^5$, in engagement with a cam, G', on the cam-shaft D. The adjustable connections shown enable the curved-line deflecting-block to develop coils from the smallest diameter to the largest. As in prior machines of this class, a pitch-line deflecting-block is also used for co-operating with the curved-line block in defining the distance between any two coils, or, in other words, for making either close-coiled or open-coiled springs, or springs which are partially closely coiled and partially open. It is not material to my present invention in what form said pitch-line deflecting-block be made or in what manner it is operated, so long as it can co-operate with other portions of my machine in practical service. I have used, and illustrate in the drawings, two forms of pitch-line deflectors, either of which can be relied upon, although I prefer the form shown in Fig. 13, because of its simplicity.

In Figs. 1 and 2, as well as in Fig. 4, the pitch-line deflector H is at the end of a longitudinally-sliding rod, $h$, coupled by an adjustable link, $h'$, and a shorter link, $h^2$, to one end of a lever, $h^3$, having an adjustable fulcrum, and at its opposite end said lever is provided with a friction-wheel in engagement with the cam H' on the cam-shaft D. The adjustability of these several connections enables such a control of the deflector-block H as to afford any desired pitch and any desired variations therein during the coiling operation.

The pitch-line deflector $H^2$, (shown in Fig. 13,) is bolted directly upon the top of the arm $g$, and it is in the form of a plate, both flat and curved, provided with an edge of proper contour and slightly overhanging the curved-line deflecting-block G, so that as the coils enlarge different portions of the edge of the pitch-line deflector are engaged by the wire. The movements of the arm $g$ obviously variably locate the deflecting-block $H^2$, and the latter can be advanced or retired by means of the adjusting-screws $h^4$, the block being slotted and secured to said arm by the clamping-bolt $h^5$.

In my machine the springs, when fully coiled, are cut and severed from the incoming wire by an intermittingly-operated cutter while the wire is at rest. I will therefore first describe the mechanism devised by me by which the feed-rolls are intermittingly operated and the feeding and forcing of the wire properly controlled; and although I prefer to do this without actually stopping any portion of the machine, good but less desirable results will accrue if the feed-rolls be actually at rest during the cutting operation, and both modes of operation are illustrated. As shown in Figs. 1, 5, and 6, the lower feed-roll, E, is adjustably mounted by means of a screw upon a lever-arm, $i$, having its fulcrum in the rock-shaft $i'$, having a second arm, $i^2$, carrying at its outer end a wheel, $i^3$, in engagement with a cam $E^2$ on the cam-shaft D. A very heavy retractile spiral spring, $i^4$, (or a heavy weight,) secured to said lever and to the frame of the machine causes the lower feed-roll to be so heavily forced toward the upper roll as to secure proper feeding contact with the wire. The cam is so shaped and timed that as soon as a spring has been fully coiled the lower feed-roll drops and the wire stands at rest, although both feed-rolls continue to rotate. It will be seen that the feed-rolls not only advance the wire intermittingly, as in machines for making wire chains and nails, but said rolls also perform nearly all of the actual work in coiling a spring, in that the latter is formed as a result of forcibly thrusting the wire against deflecting-surfaces, and this heavy thrusting duty is wholly performed by said rolls. I find that these rolls can be reliably operated as to contact with the wire by means of a spring and proper leverage, and thus enable the rolls to operate with yielding pressure, so as to compensate for the usual variations in the diameter and contour of wire, and I also secure very prompt action in changing the rolls from non-operative to operative positions. Now, in lieu of thus dropping the lower feed-roll, both can be actually stopped, as in prior spring-making machines, without departure from certain other portions of my invention, as, for instance, as shown in Fig. 10. In this case power is communicated from the main shaft B to the upper feed-roll shaft, C, by gearing at $c$, as before described, although at another point on said shaft. The feed-roll shaft at one end is geared into the train of gears at $c^2$, as before; but at its opposite end it loosely carries a sleeve, $c^9$, on which the upper feed-roll, E', is mounted. The two gears at $c'$ are as before described, but one is on the said sleeve $c^9$ and the other on the lower feed-roll shaft. The clutch $k$ is splined upon the shaft C, and engages with a clutch-face on the coincident face of the adjacent gear $c'$, and said clutch is automatically controlled by the shipper-levers $k'$, acted upon at proper intervals by the cam $E^3$, in lieu of the cam $E^2$, before described, thus providing for wholly stopping both feed-rolls, and leaving all other rotary parts of the machine in motion during the cutting operation.

As soon as the feeding of the wire ceases and the spring has been formed my wire-cutter I proceeds to operate. Said wire-cutter is here shown in the form of shears, and these, with their operating mechanism, have been specially devised by me for use in this machine, and they are well illustrated in Figs. 1, 2, 5, 6, and 7. These shears lie flatly on the top plate of the frame, with their jaws $l$ and $l'$ so overhanging the side of the frame as to be in line with the wire of the last coil of each spring. Each jaw has a long tail-piece or handle, and these are pivoted together at $l^2$ in line with the cutting-faces of the jaws. The tail-piece of the lower jaw, $l'$, is pivoted upon a stationary stud on the plate $l^3$, which is secured to the top plate of the frame, and is rendered adjustable by means of a slot and bolt at $l^4$. In lieu of the plate $l^3$ the top plate, $a'$, may be slotted for adjustably receiving the pivot-bolt $l^5$ of the tail-piece of the lower jaw. The tail-piece of the upper jaw, $l$, is coupled by means of an adjustable link, $m$, to the upper end of a vertical curved lever, $m'$, which is pivoted at its lower end on rod or bolt $m^2$, extending through both side plates of the frame. Said lever $m'$ is provided with a wheel, $m^3$, which engages with a cam, I', on the cam-shaft D, said wheel being maintained in contact with the cam by the retractile spring $m^4$. As thus far described it will be obvious that the rotation of the cam I' will cause the jaws of the shears to open and close, so as to cut any wire which might be interposed between them; but as the wire to be cut occupies a fixed position the jaws of the shears must be opened and advanced to embrace the wire for cutting it and then retire, so as to be out of the way of the wire next advancing to form the initial coil of the next spring to be made. The jaws of the shears are therefore moved to and fro by causing the shears to bodily vibrate on the pivot $l^5$, by which the tail-piece of the lower jaw is secured to the plate $l^3$ by means of an adjustable link, $n$, by which said shears are coupled to a vertical curved lever, $n'$, carrying a wheel which is engaged by a cam, $o$, near one end of the cam-shaft, at the proper time to carry the jaws toward the wire to be cut, the retiring movement being effected by means of the retractile spring $o'$, which has its ends respectively secured to the rear side of the shears and the top of the frame, all as clearly indicated in Figs. 2, 6, and 7. These shear-operating cams and their connections with the shears are so constructed and arranged to operate, as to time, that when the jaws occupy their most rearward position they are wide open. After a spring has been coiled and the feed-rolls stopped the cam $o$ moves the jaws forward until they have embraced the wire at the proper point, and then the shear-cam I' separates the tail-pieces and closes the jaws for severing the wire, whereupon the cam $o$ permits the spring $o'$ to retract the jaws to their rearward position, and immediately thereafter the cam $E^2$ permits the heavy spring, $l^4$ to throw the lower feed-roll into an operative position, and another spring is commenced, and so on, throughout a reel-load of wire.

Now, while the shears I, as described, involve the best form of cutting mechanism known to me, and while I make certain special claim thereto, it is to be understood that other types of cutting mechanism may be used in lieu of said shears without departure from certain other portions of my invention—as, for instance, the severing of the wire may be performed by means of a circular saw, as illustrated in connection with Fig. 16, wherein the driving-shaft B and cam-shaft D are indicated as co-operatively connected to a rotary saw, $I^2$. The saw is mounted on a sliding bar, $m^5$, reciprocated by means of the cam $I^3$ on the cam-shaft and the lever $m^6$. Power is communicated to the saw by means of a cord-belt from the main shaft around a pair of loose idler-pulleys, $m^7$, on a vertical stud projecting upwardly from the sliding bar $m^5$. The reciprocation of the saw in the line of its path need seldom be greater than one-half an inch, and movement to that extent can readily be provided for without unduly tightening the belt, which may be slackened a little when the saw is at its most rearward or inactive position, and yet be effectively tightened when moved forward into active service. It will, however, be seen that the opening, closing, and vibrating movements of my shear-cutter as specially devised by me are well adapted to shears intended to cut the wire, even if the feed-rolls be not intermittingly operated, because as the jaws of the shears close they are also advancing, and should the wire be continuously fed at slow speed my shears would operate better than any known to me, and with less liability of injury to the spring.

As is usual in machines of this general class, I employ a horizontal projecting rod, p, (see Fig. 4,) adjacent to the deflectors and over the straightener, and hence the springs p', as they are formed, are coiled around it, and it serves as a suitable interior support for them until they are severed, whereupon they fall endwise from said rod. I should also state that the wire conductor or guide d is not broadly new; but heretofore it only performed the function of a mere guide in connection with feed-rolls which maintained uniform relations and kept up their grip on the wire; but in my machine said conductor maintains the wire in a straight line when the feed-rolls are separated, and hence the wire when at rest cannot spring sidewise and escape the next gripping action of the rolls. It will be clear, too, that when the grip of the feed-rolls ceases and the wire is at rest there is a rearward thrusting strain upon the wire at the curved-line deflector, and that this thrust is wholly resisted by the wave-line straightener, and hence the latter co-operates with said conducting-guide in controlling the wire when at rest.

It will be clearly obvious that the feature of stopping the wire and then operating a cutter can be employed with the well-known deflector, which operates not only as a curved-line deflector, but also as a pitch-line deflector, because of its angular adjustment—as, for instance, as illustrated in Fig. 17, wherein the deflector-arm g has at its outer end the deflector G, axially mounted in a bearing-block, $g^6$, which, by means of laterally-elongated holes and bolts therein, is rigidly secured to the end of said arm and capable of variation in its angular adjustment with reference to the path of the wire, and also with reference to the axis of the rock-shaft on which said arm is mounted, and by the construction of said bearing-block in two parts and swiveling them together by means of a vertical clamp-bolt, $g^7$, as shown in Fig. 18, the deflector G may be made to assume any angular position which could be possibly desired, thus indicating the value of certain portions of my invention regardless of whether a pitch-line deflector, as a separate element, be employed or not.

For making simple conical springs in the machine as organized in Fig. 1, the cam $E^4$, as shown in Fig. 12, is used in lieu of the cam $E^2$ of Fig. 1.

Having thus described my invention, I claim as new and desire to secure by Letters Patent—

1. The combination, substantially as hereinbefore described, of the feed-rolls stopped at the completion of each spring, the conducting-guide in front of said rolls, and a wire-straightener at the rear of said rolls.

2. The combination, substantially as hereinbefore described, of feed-rolls, a curved-line deflector, and a wave-line straightener interposed between said feed-rolls and said deflector.

3. The combination, substantially as hereinbefore described, of the feed-rolls, an automatically-reciprocated curved-line deflector, and a wave-line straightener interposed between said feed-rolls and said reciprocated deflector.

4. The combination, in a wire-spring-coiling machine, of the intermittingly-operated feed-rolls, the curved-line deflector, the wire-straightener interposed between said rolls and said deflector, and the wire-cutter intermittingly operated for cutting a finished spring from the incoming wire during the non-operation of the feed-rolls.

5. The combination, substantially as hereinbefore described, of the intermittingly-operated feed-rolls, the wire-guide in front of said rolls, the wire-straightener at the rear of said rolls, the curved-line deflector, and the pitch-line deflector.

6. The combination, substantially as hereinbefore described, of the intermittingly-operated feed-rolls, the wire-guide and the wire-straightener, these being located respectively in front of and at the rear of said rolls, the curved-line deflector, the pitch-line deflector, and an intermittingly-operated wire-cutter.

7. The combination of feed-rolls, the wave-line straightener, the curved-line deflector receiving wire directly from said straightener, and the pitch-line deflector, substantially as described.

8. The combination, substantially as hereinbefore described, of the intermittingly-operated feed-rolls, the wave-line wire-straightener at the rear of said rolls, and the two deflectors.

9. The combination, substantially as described, of feed-rolls, the wave-line straightener at the rear of said rolls, the two deflectors, and the wire-cutter.

10. In a wire-spring machine, the combination, substantially as hereinbefore described, of the wire-cutting shears, one jaw thereof having a tail-piece pivoted upon a stationary stud and the other having a tail-piece pivotally connected to a lever operated by a cam, a second cam, and a lever coupled to both jaws for vibrating them in the path of the wire in the terminal coil of a spring.

11. In a machine for making coiled-wire springs, the combination, substantially as hereinbefore described, of a pair of wire-feeding rolls, a lever on which one of said rolls is adjustably mounted, a cam operating through said lever to separate said rolls after the required number of rotations, and a spring for forcing said rolls with yielding pressure upon wire carried between them.

WILLIAM L. GODDARD.

Witnesses:
HARRY OSTERHELD,
R. EICKEMEYER, Jr.